(12) United States Patent
Yoo

(10) Patent No.: US 6,186,918 B1
(45) Date of Patent: Feb. 13, 2001

(54) ADJUSTABLE AXLE APPARATUS

(76) Inventor: Sung Ryul Yoo, 11451 Lowemont St., Norwalk, CA (US) 90650

(*) Notice: Under 35 U.S.C. 154(b), the term of this patent shall be extended for 0 days.

(21) Appl. No.: 09/354,609

(22) Filed: Jul. 16, 1999

(51) Int. Cl.[7] ............................... F16H 7/10; B62M 1/00
(52) U.S. Cl. ............................................. 474/112; 280/229
(58) Field of Search ........................ 474/49, 53, 101, 474/50, 112–117, 133–138; 280/285–288, 278, 282, 229, 86.75, 86.754, 236–237; 301/1, 105.1, 110.5

(56) References Cited

U.S. PATENT DOCUMENTS

| | | | |
|---|---|---|---|
| 605,182 | * 6/1898 | Johnston | 280/229 |
| 3,717,361 | * 2/1973 | Vanderpool | 280/229 |
| 4,421,308 | 12/1983 | Nagy . | |
| 4,588,232 | * 5/1986 | Kim et al. | 280/229 X |
| 4,755,005 | * 7/1988 | Tsai | 280/229 X |
| 4,889,354 | 12/1989 | Wen . | |
| 4,952,196 | 8/1990 | Chilcote et al. . | |
| 5,002,295 | * 3/1991 | Lin | 280/229 X |
| 5,165,762 | 11/1992 | Phillips . | |
| 5,233,885 | 8/1993 | Lin et al. . | |
| 5,249,847 | * 10/1993 | Lee | 280/229 X |
| 5,553,878 | 9/1996 | Davignon et al. . | |
| 5,588,662 | 12/1996 | Fortier . | |
| 5,851,165 | 12/1998 | Wei et al. . | |

* cited by examiner

Primary Examiner—David A. Bucci
Assistant Examiner—Marcus Charles
(74) Attorney, Agent, or Firm—Lee & Hay

(57) ABSTRACT

An adjustable axle assembly for use with a wheel comprises a first hub defining a first aperture in an off-centered position so geometric centers of the first aperture and the first hub are eccentrically located, the first aperture adapted to receive an axle; a second hub defining a second aperture in an off-centered position so the geometric centers of the second aperture and the second hub are eccentrically located, the second aperture adapted to rotationally receive the first hub; and a locking assembly coupling and controlling the rotational movement of the first hub and the second hub. The second aperture of the second hub includes a plurality of indents formed on the inner surface of the second hub separated by a predetermined angle for releasably engaging the locking assembly, wherein the plurality of indents represents an angle of eccentric rotation of the wheel. At least one of the plurality of indents positions the first hub with respect to the second hub to place the axle in a geometric center of the second hub to provide a concentric rotation of the wheel.

25 Claims, 4 Drawing Sheets

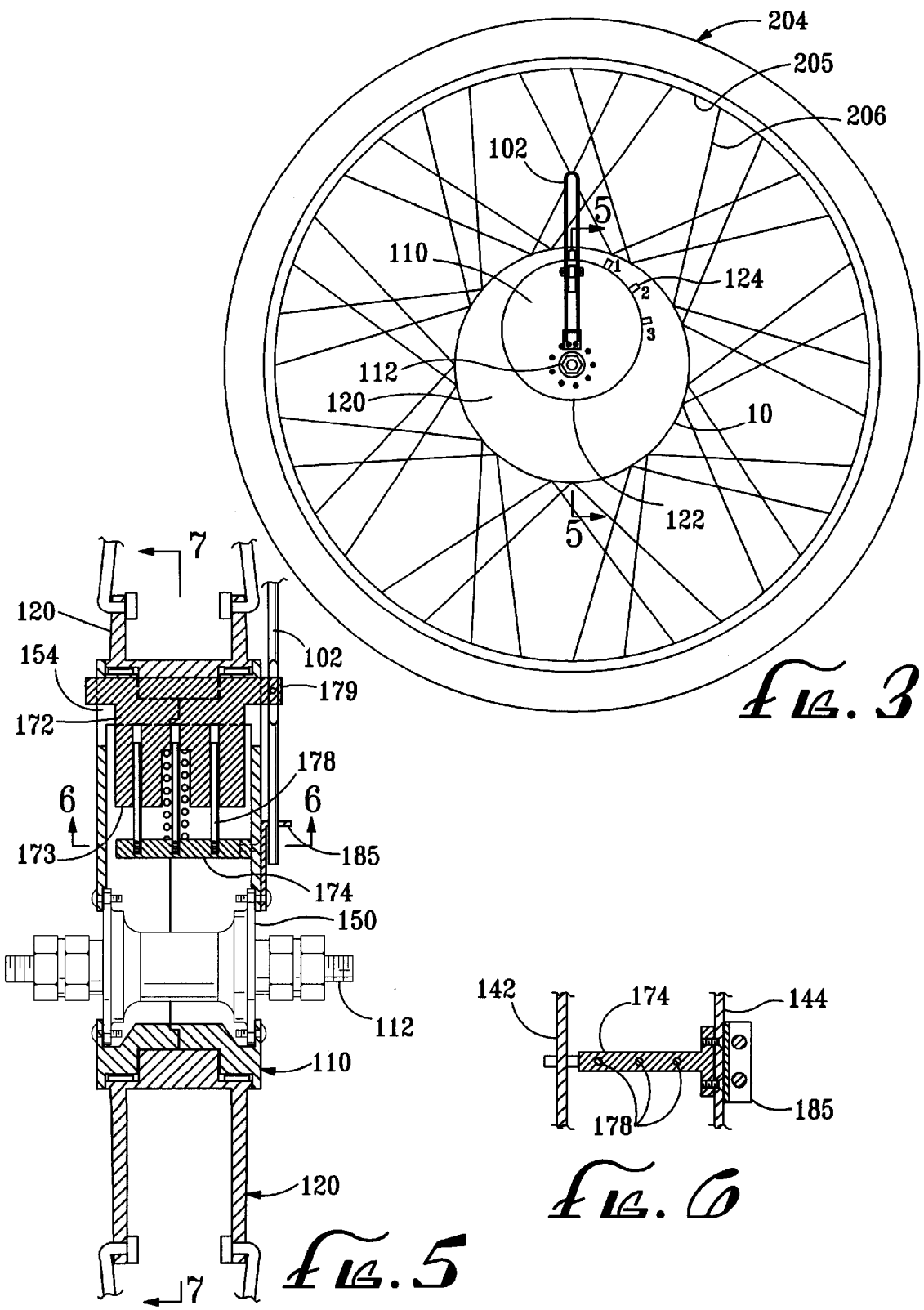

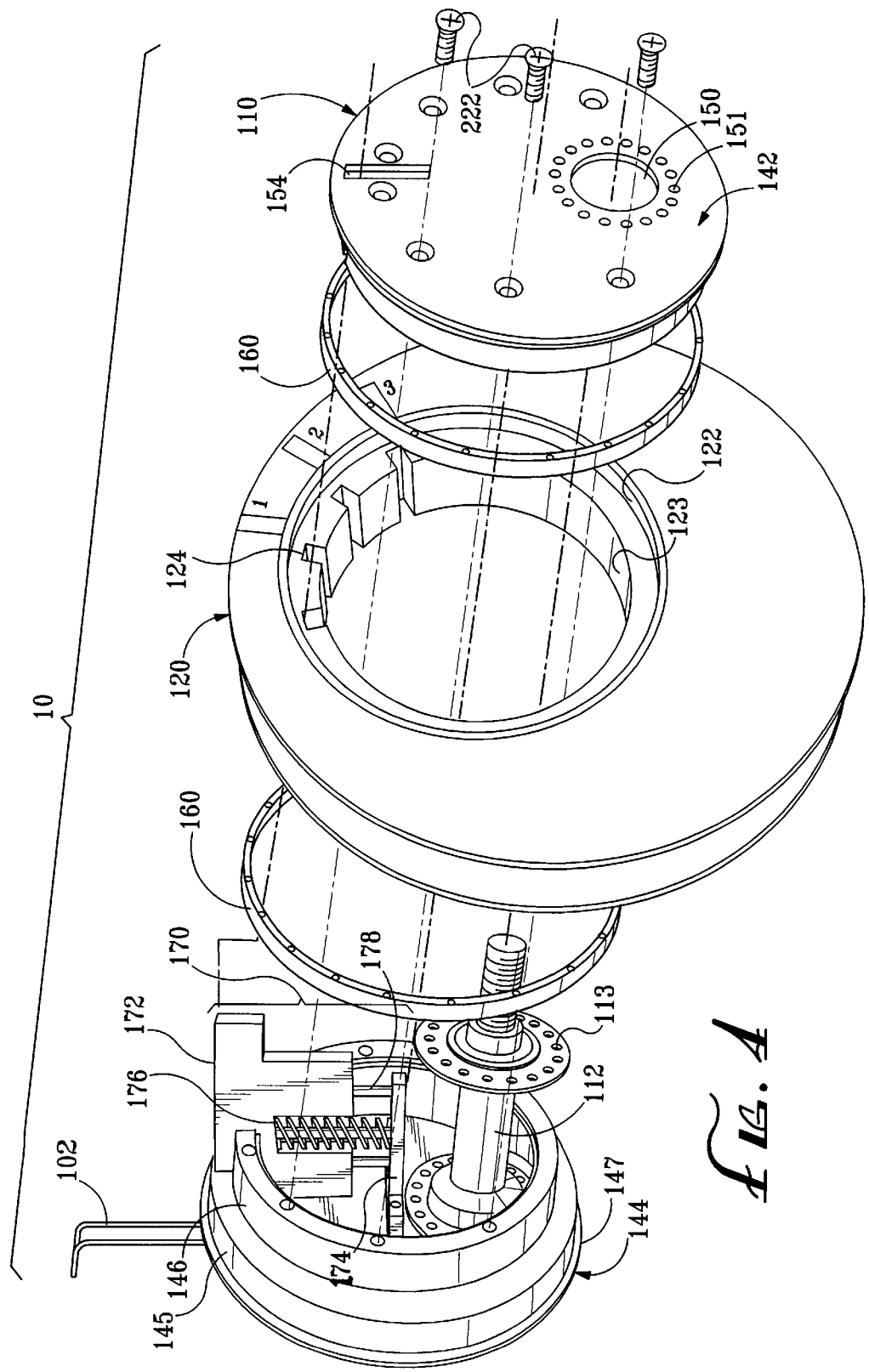

ADJUSTABLE AXLE APPARATUS

BACKGROUND OF THE INVENTION

1. Field of the Invention

The present invention relates to an axle structure for a riding apparatus, such as a bicycle, and more particularly, an axle assembly adapted to be adjustable to offset the position of the axle from the geometric center of the wheel.

2. Discussion of the Related Art

Although the primary mode of ground transportation is the automobile, the bicycle continues to be a popular mode of transportation, particularly for recreational purposes. A typical bicycle enables a rider to obtain relatively high speeds, which is advantageous while traversing flat terrain or going downhill. With the advent of mountain bicycles, riders can enjoy such bicycles in a rugged mountain terrain with bumps and pot holes.

A bicycle axle is a major driving part to a bicycle since it transfers the force received from two cranks to a driving wheel which then drives the bicycle. A conventional bicycle has a concentric wheel with an axle in the center thereof to drive the bicycle. The position of the axle cannot be adjusted.

Known bicycle axle structure includes U.S. Pat. No. 5,553,878 to Davignon et al. The device disclosed in the Davignon patent is directed to an adjustable riding toy in both bicycle and tricycle forms. The bicycle is equipped with at least one wave ride wheel allowing a rider to change between a smooth ride and an up-and-down ride. This is accomplished by providing a wheel having a plurality of axle apertures therein. By placing the axle in one of the axle apertures, the wheel of the bicycle can be of a concentric shape or an eccentric shape.

While the above device fulfills its particular objectives and requirements, one disadvantage is that the axle and wheel assembly has to be physically disassembled from the bicycle frame. In particular, the axle has to be removed from one axle aperture of the wheel and then replaced into another axle aperture prior to re-fitting with the bicycle frame. This disassembling and re-assembling requires mechanical tools and effort and is therefore very cumbersome and discouraging.

SUMMARY OF THE INVENTION

Accordingly, the present invention is directed to an axle structure or assembly of a wheel that substantially obviates one or more of the problems due to limitations and disadvantages of the related art.

An object of the present invention is to provide an adjustable axle assembly for adjustably shifting the position of the axle with respect to a wheel to provide eccentric rotation of the wheel.

Another object of the present invention is to provide a simple and easy way to adjust the axle position without using any tools.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an adjustable axle assembly for use with a wheel comprises a first hub defining a first aperture in an off-centered position so geometric centers of the first aperture and the first hub are eccentrically located, the first aperture adapted to receive an axle; a second hub defining a second aperture in an off-centered position so the geometric centers of the second aperture and the second hub are eccentrically located, the second aperture adapted to rotationally receive the first hub; and a locking assembly coupling and controlling the rotational movement of the first hub and the second hub. Preferably, a roller bearing is disposed in the second aperture of the second hub between the first hub and second hub to assist rotation of the first hub.

According to one aspect of the preferred embodiment, the locking assembly is disposed in the first hub and includes a lock protruding from the first hub to releasably engage the second hub. The locking assembly includes a platform secured to an inner surface of the first hub; at least one alignment rod extending from the platform to align or guide the movement of the lock; and a spring disposed in surrounding relation to the alignment rod, wherein the spring biases the lock to a locking position to prevent the first hub from rotating with respect to the second hub.

According to another aspect of the preferred embodiment, the first hub includes a slit, wherein a wing of the lock protrudes therethrough and is coupled to a lever to releasably control the rotation of the first hub with respect to the second hub. Moreover, the first hub includes right and left plates, each plate defining an aperture adapted to receive the axle, the right and left plates being fastened together from opposite sides of the second aperture of the second hub.

According to another aspect of the present invention, the second aperture of the second hub includes a plurality of indents formed on the inner surface of the second hub separated by a predetermined angle for releasably engaging the locking assembly, wherein the plurality of indents represents an angle of eccentric rotation of the wheel. At least one of the plurality of indents positions the first hub with respect to the second hub to place the axle in a geometric center of the second hub to provide a concentric rotation of the wheel.

In another embodiment of the present invention, a mobile apparatus comprises at least one wheel having a rim with a geometric center; a first hub defining a first aperture in an off-centered position so geometric centers of the first aperture and the first hub are eccentrically located, the first aperture adapted to receive an axle; a second hub defining a second aperture in an off-centered position so the geometric centers of the second aperture and the second hub are eccentrically located, the second aperture adapted to rotationally receive the first hub, wherein the second hub has the same geometric center as the rim; and a locking assembly coupling and controlling the rotational movement of the first hub and the second hub. Preferably, a roller bearing is disposed in the second aperture of the second hub between the first hub and second hub to assist rotation of the first hub.

According to one aspect of the preferred embodiment, the locking assembly is disposed in the first hub and includes a lock protruding from the first hub to releasably engage the second hub. The locking assembly includes a platform secured to an inner surface of the first hub; at least one alignment rod extending from the platform to align the movement of the lock; and a spring disposed in surrounding relation to the alignment rod, wherein the spring biases the lock to a locking position to prevent the first hub from rotating with respect to the second hub.

According to another aspect of the preferred embodiment, the first hub includes a slit, wherein a wing of the lock protrudes therethrough and is coupled to a lever to releasably control the rotation of the first hub with respect to the second hub. Moreover, the first hub includes right and left plates, each plate defining an aperture adapted to receive the axle, the right and left plates being fastened together from opposite sides of the second aperture of the second hub.

According to another aspect of the present invention, the second aperture of the second hub includes a plurality of indents formed on the inner surface of the second hub separated by a predetermined angle for releasably engaging the locking assembly, wherein the plurality of indents represents an angle of eccentric rotation of the wheel. At least one of the plurality of indents positions the first hub with respect to the second hub to place the axle in a geometric center of the second hub to provide a concentric rotation of the wheel.

The second hub is preferably connected to the rim through a plurality of spokes. Alternatively, the rim of the wheel can be an outer circumferential surface of the second hub.

According to another embodiment of the present invention, a method of manufacturing an adjustable axle assembly for use with a wheel is provided. The method comprises the steps of providing a first hub defining a first aperture in an off-centered position so geometric centers of the first aperture and the first hub are eccentrically located, the first aperture adapted to receive an axle; providing a second hub defining a second aperture in an off-centered position so the geometric centers of the second aperture and the second hub are eccentrically located, the second aperture adapted to rotationally receive the first hub; and providing a locking assembly in the first hub for releasably coupling and controlling the rotational movement of the first hub and the second hub.

It is to be understood that both the foregoing general description and the following detailed description are exemplary and explanatory and are intended to provide a further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

FIG. 3 illustrates an elevation view of a bicycle wheel using the adjustable axle assembly;

FIG. 4 illustrates a disassembled view of the adjustable axle assembly according to the present invention;

FIG. 5 illustrates a cross-sectional view with respect to line 5—5 of FIG. 3;

FIG. 6 illustrates a cross-sectional view with respect to line 6—6 of FIG. 4;

DETAILED DESCRIPTION OF THE PREFERRED EMBODIMENTS

With reference to the drawings, and in particular to FIGS. 1–7B thereof, an adjustable axle assembly embodying the principles and concepts of the present invention will be described.

Figure 1:
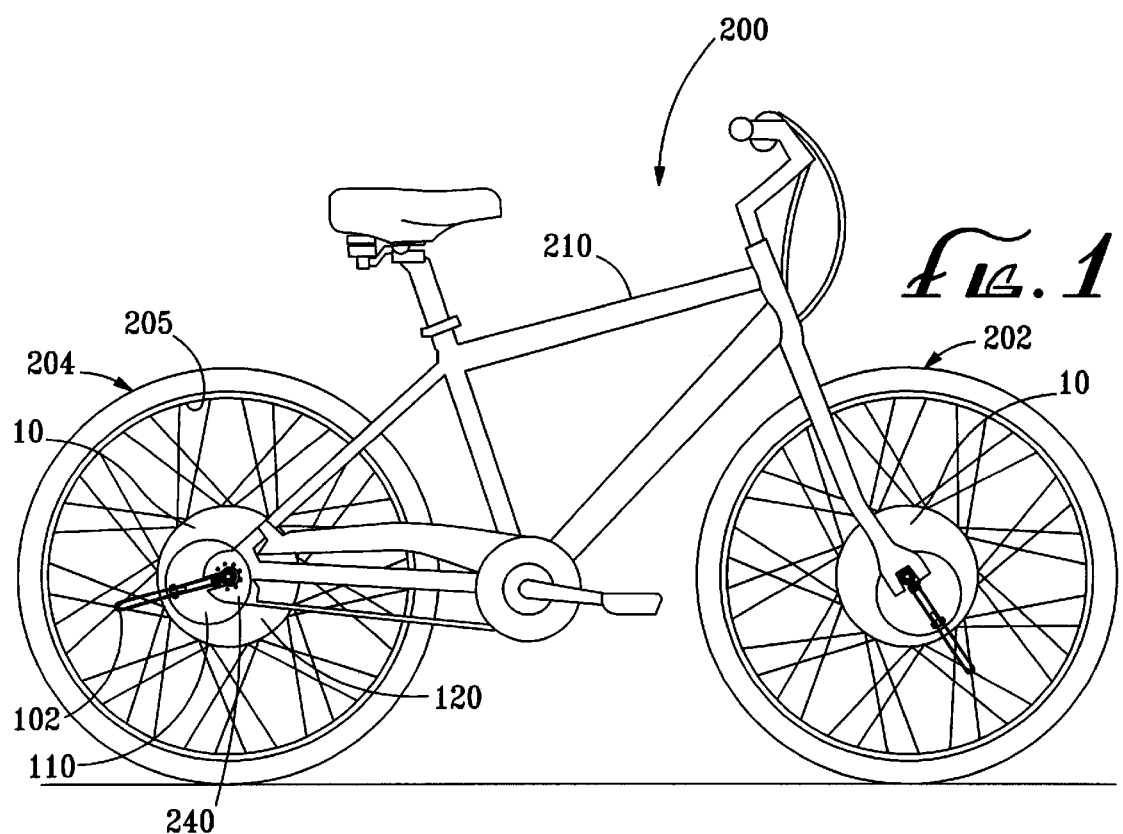
FIG. 1 illustrates a schematic view of a bicycle using an adjustable axle assembly according to a preferred embodiment of the present invention.

FIG. 1 illustrates a schematic view of a bicycle using an adjustable axle assembly 10 according to a preferred embodiment of the present invention. Referring to FIG. 1, the bicycle 200 embodiment of the present invention will be used to illustrate one preferred embodiment. However, many aspects of the invention may be adapted for use on riding or other vehicles with wheels. For example, the adjustable axle assembly 10 according to the preferred embodiment of the present invention may be used on a tricycle or any vehicles requiring wheels, including toy cars, carts and bicycles. When used in a bicycle 200, the axle assembly 10 may be used for a front wheel 202 and/or a rear wheel 204.

The bicycle 200 comprises a body 210, a front wheel 202 and a rear wheel 204. The construction of the body is preferably from a suitable molded metal material and is generally known in the industry. However, the bicycle 200 may be constructed from any other suitable materials, such as various plastic composites. The front and rear wheels 202 and 204 are rotatably connected to the body 210, to allow the bicycle 200 to roll.

Figure 2:
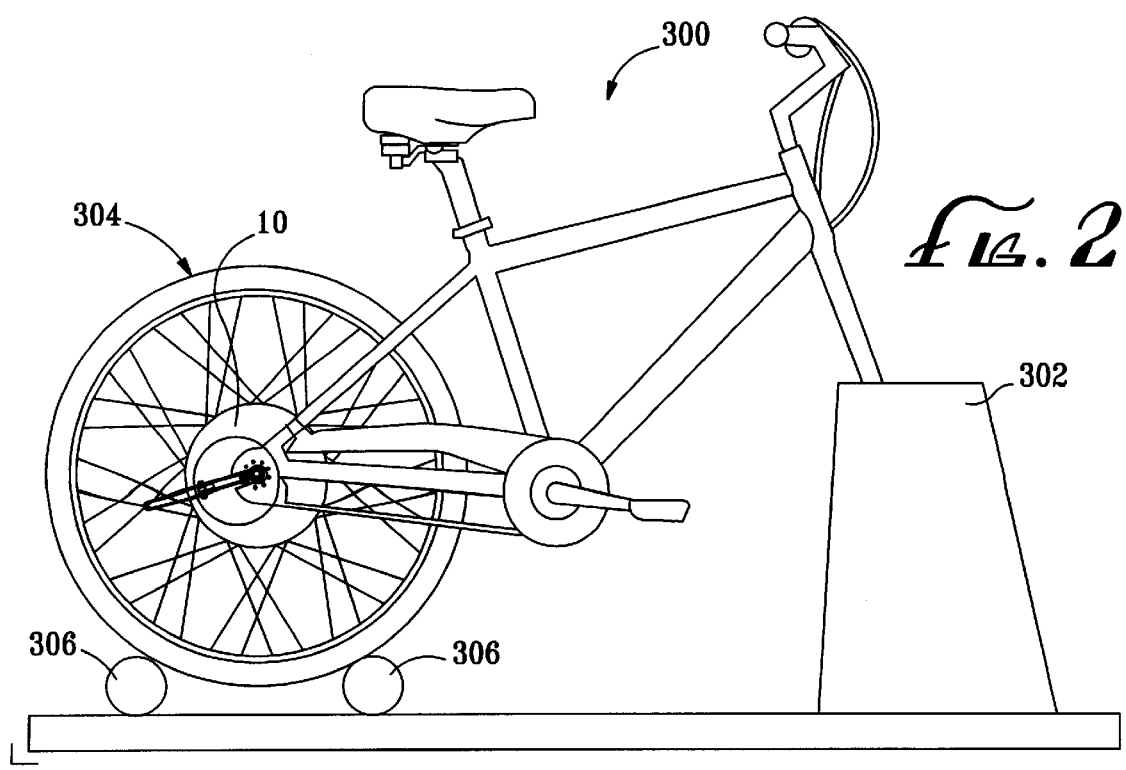
FIG. 2 illustrates a schematic view of a fixed exercise bicycle using the adjustable axle assembly according to the preferred embodiment of the present invention.

FIG. 2 illustrates a schematic view of a fixed exercise bicycle 300 using the adjustable axle assembly 10 according to the preferred embodiment of the present invention. Since the front end of the exercise bicycle 300 is fixedly attached to a platform 302, only the rear wheel 304 is equipped with the axle assembly 10. The rear wheel 304 is placed on a roller assembly 306 for support and stationery ride during exercise.

By simply rotating a first hub 110 with respect to a second hub 120 using a lever 110 extending from the first hub 110, the position of the axle with respect to the rim 205 of a wheel is adjusted, giving a rider an eccentrical movement of the wheel. In other words, because the axle is not located at a geometric center of the wheel 204, the bicycle 200 or the exercise bicycle 300 is provided with an up-and-down and/or undulating motion caused by an eccentric rotation of the wheel. The position of the first hub 110 with respect to the second hub 120 determines the angle of eccentric rotation of the wheel. When both wheels 202 and 204 in the bicycle 200 have the axle assembly 10, then the eccentric movement of each wheel can be independently controlled as the rider desires.

The adjustable axle assembly 10 is shown generally in FIGS. 3–7B. FIG. 3 illustrates an elevation view of a bicycle wheel 204 using the adjustable axle assembly. For purposes of brevity, only the rear wheel 204 with the axle assembly 10 will be used to illustrate the present invention.

The wheel 204 includes a rim 205 connected to the axle assembly 10 through a plurality of spokes 206. In particular, the spokes 205 connect the second hub 120 of the axle assembly 10 with the rim 205. Alternative to the spokes 206 which are made with rods or bars, the wheel 204 may be equipped with a solid and plane spoke which completely fills the region between the rim 205 and the second hub 120. A detailed explanation of the axle assembly 10 is provided below.

FIG. 4 illustrates a disassembled view of the adjustable axle assembly 10 according to the present invention. The first hub 110 and the second hub 120 of the axle assembly 10 according to the preferred embodiment are rotatably disposed with each other. The first hub 110 is disposed in a geometrically off-centered position with respect to the second hub 120. The first hub 110 is adapted to receive an axle 112 which is mounted on a fork 240 shown in FIG. 1. The position of the axle 112 is also geometrically offset from the center of the first hub 110. The first hub 10 includes two matching sets of cylindrical right and left plates 142 and 144. The right plate 142 and the left plate 144 are joined with each other using any suitable process. In the preferred embodiment, a set of screws 222 are used to fasten the plates 142 and 144 together.

The left plate 144 of the first hub 110 is constructed to include a step-like structure having an inner cylindrical member having different diameters. Preferably, the left plate 144 has a first inner cylinder 145 and a second inner cylinder 146, both of which are integrally attached to a left cover 147. Preferably, the left cover 147, first inner cylinder 145 and second inner cylinder 146 are made of metal or other suitable material, such as plastic, known to one of ordinary skill in the art and are formed as a single piece. The first inner cylinder 145 is adapted to fit in the first aperture 122 defined by the second hub 120. The second inner cylinder 146 is adapted to fit in the second aperture 123 defined by the second hub 120. The first and second apertures 122 and 123 are concentric and their centers are offset from the center of the second hub 120. The description of the right plate 142 of the first hub 110 is identical to the left plate 144 above and will not be repeated.

The right and left plates 142 and 144 each has an axle aperture 150 adapted to receive an axle 112. Surrounding the axle aperture 150 is a plurality of holes 151 for aligning and fastening with the holes 113 formed in a collar member of the axle 112. Preferably, the axle 112 is disposed between the right and left plates 142 and 144 and is fastened with screws through the holes 151 in the right and left plates 142 and 144 and the holes 113 in the collar member of the axle 112.

Referring to FIGS. 4, 5 and 6, the first hub 110 also includes a locking assembly 170 used for locking the position of the first hub 110 with respect to the second hub 120. The locking assembly 170 includes a lock 172, a platform 174, a spring 176 for biasing the lock with respect to the platform 174 and a plurality of alignment rods 178 for aligning the lock 172. In the preferred embodiment, the platform 174 is fixedly attached to approximately the center of the inner surface of the left plate 144. Alternatively, the platform 174 may be fixed to the inner surface of the right plate 142 of the first hub 110. Vertically extending from the platform 174 are three alignment rods 178, which are better illustrated in FIGS. 5 and 6. The alignment rods 178 may be screwed into the platform 174, or alternatively, may be molded with the platform 174 as a single piece component.

The lock 172 is a Greek letter "π" shaped part which is inserted into a slit 154 defined in both right and left plates 142 and 144. The lower portion of the lock 172 has receptacles 173 for receiving three alignment rods 178. Preferably, the lock 172 has a spaced middle portion for accommodating the spring or coil 176. The spring 176 is used for biasing the lock 172 away from the platform 174. The lock 172 is arranged such that its vertical movement is limited by the longitudinal length of the slit 154 and the location of the platform 174. To assist the sliding of the lock 172 in the slit 154, a lever 102 is attached to one end of the wing 179, as shown in FIG. 5. The components of the locking assembly 170 are preferably made of suitable metal or metal composites or other materials, such as plastic, known to one of ordinary skill in the art.

In an alternative embodiment, the lock 172 may have a shape which has only one wing 179 extending through a slit 154 formed only on the left plate 144 of the first hub 110 since the lever 102 is connected only to that wing 179 as shown in FIG. 4. When such lock 172 is used, a slit 154 formed in the right plate 142 of the first hub 142 is obviously not necessary and can be eliminated.

The locking assembly 170 can be configured to be placed in the second hub 120 in lieu of the first hub 110. In such an embodiment, the indents are formed in the circumference of the first hub 110, while the lock is movably extending from the second hub 120 to control the rotational position or the angle of eccentric rotation of the first hub 110 with respect to the second hub 120.

Referring to FIG. 4, the second hub 120 has a first aperture 122 sized to receive the first inner cylinder 145 of the first hub 110. The second hub 120 also has a second aperture 123 sized to receive the second inner cylinder 146. In the preferred embodiment, the first aperture 122 is slightly larger in diameter to allow the first hub 110 to rotate therein. In particular, the first aperture 122 is sufficiently large to receive a roller bearing 160 which is placed in surrounding relation to the first inner cylinder 145 of the first hub 110. The presence of the roller bearing 160 reduces friction between the first and second hubs 110 and 120. Alternative to the roller bearing 160, other suitable bearing assembly may be used. In addition, a lubricating material, such as lubricating oil or power, may replace the roller bearing 160.

The second hub 120 is also equipped with a plurality of indents 124 for adjusting the rotating position or the angle of eccentric rotation of the first hub 110. The indents 124 are used to offset the position of the first hub 110 with respect to the second hub 120 which, in effect, causes the position of the axle 112 to shift with respect to the geometrical center of the second hub 120. The angle between the first indent and the fourth indent is about 70–100 degrees, preferably 85 degrees, to provide a varying degree of eccentric ride. In the preferred embodiment, there are four indents 124 for offsetting an axle position.

Referring to FIGS. 5 and 6, the lever 102 for controlling the movement of the lock 172 is slidably attached to a bracket 185 which is securely mounted on the outer surface of the first hub 110, preferably immediately above the hole 150 receiving an axle 112. The bracket 185 has two holes for receiving rods that form the lever 102. Because the lever 102 is pivotally connected to the wing 179 of the lock 172, it does not need to be secured to the first hub 110.

Figure 7A:
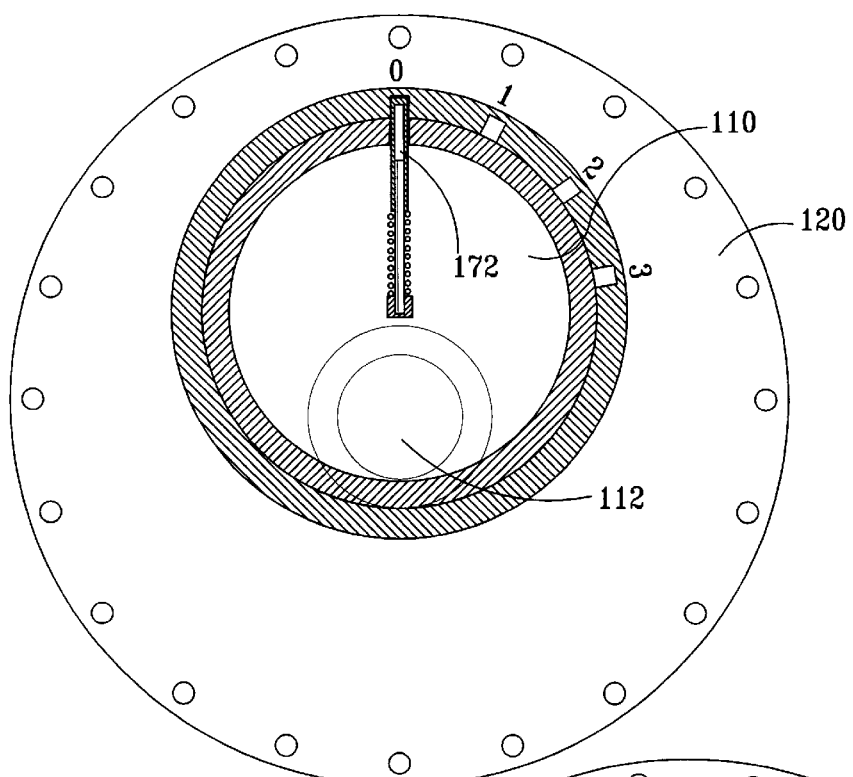
FIG. 7A illustrates a cross-sectional view with respect to line 7—7 of FIG. 4 with an axle in a concentric position.
Figure 7B:
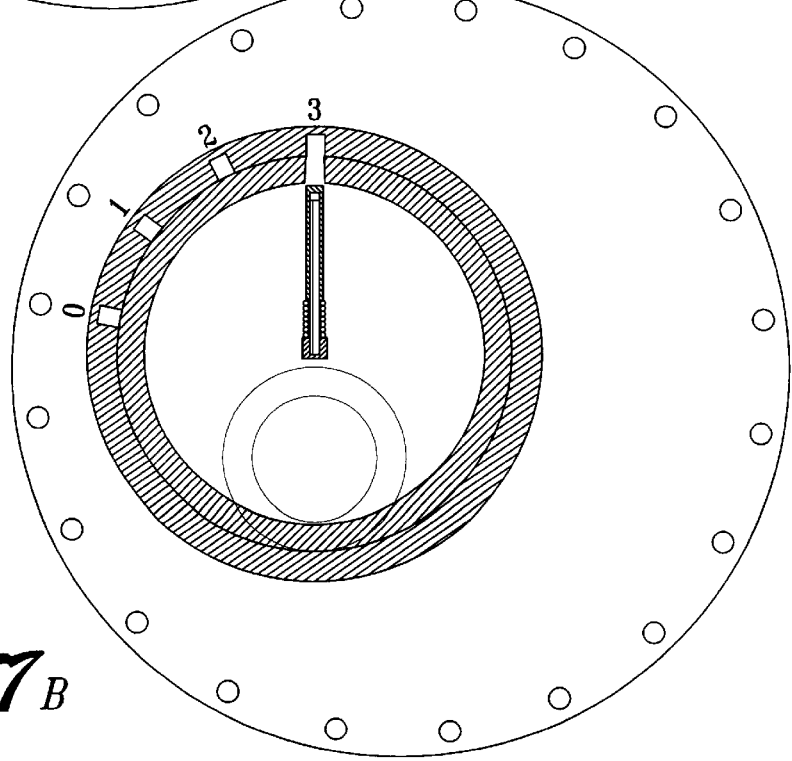
FIG. 7B illustrates a cross-sectional view with respect to line 7—7 of FIG. 4 with an axle in an eccentric position.

FIGS. 7A and 7B illustrate a cross-sectional view with respect to line 7—7 of FIG. 4. FIG. 7A illustrates an axle in a concentric position with respect to the second hub 120, and FIG. 7B illustrates an axle in an eccentric position. When the lock 172 is used to position the first hub 110 to an indent designated as "0" in the second hub 120, the axle 112 is placed in a geometric center of the second hub 120. However, when the lock 172 is used to position the first hub 110 to an indent designated anything other than "0", as shown in FIG. 7B, in the second hub 120, the position of the axle 112 is offset from the geometric center of the second hub 120. The indent designated with a higher number, such as "3," signifies a larger offset from the geometric center of the second hub 120 and provides a greater eccentric rotation of the wheel.

FIG. 5 illustrates a cross-sectional view with respect to line 5—5 of FIG. 3. In particular, FIG. 5 generally illustrates an internal layout and components of the adjustable axle assembly 10 according to the present invention. As shown, the first hub 110 is placed in a geometrically eccentric position with respect to the second hub 120. The axle 112 is securely attached to the first hub 110 using fasteners, such as screws. However, by adjusting the position of the first hub 110 with respect to the second hub 120 using the lock 172, the position of the axle 112 is geometrically offset with respect to the second hub 120.

The materials for the first hub 110 and the second hub 120 can be made with a light weight, rigid material, such as aluminum, plastic, or other suitable materials known to one of ordinary skill in the art. The second hub 120 may be formed as an integral piece of the rim 205, as shown in FIG. 3, when both the rim 205 and the second hub 120 are made with the same material. In certain instances, the second hub 120 may be constructed to serve as a rim of a wheel.

Assembly of the adjustable axle assembly 10 according to the present invention is as follows and is described in reference to FIG. 4. First, the lock assembly 170 is placed in the first hub 110 between the right and left plates 142 and 144. This is accomplished by mounting the platform 174 with alignment rods 178 to the left plate 144, placing a spring 176 in surrounding relation to the middle alignment rod and then placing the lock 172 onto the alignment rods 178 so as to slidably move thereon. The wings 179 of the lock 172 are inserted into slits 154 defined by the first hub 110. Thereafter, or prior to the placement of the lock assembly 170, an axle assembly 112 is placed between the right and left plates 142 and 144 of the first hub 110 and secured thereto.

The right and left plates 142 and 144 are each fitted with a roller bearing 160 and placed on opposite sides of the second hub through the aperture 122 defined by the second hub 120. When placing the left plate 144 with the lock assembly 170, the lock 172 is positioned in one of the indents 124 in the second hub 120. Thereafter, the right and left plates 142 and 144 are fastened together using fasteners, such as screws, to complete the first hub 110 and to rotatably mount the first hub 110 in the second hub 120. The lever 102 is then attached to the wing 179 using a fastener. The offset angle of the first hub 110 with respect to the second hub 120 is adjusted using the lock 170 by controlling the lever 102. Since the second hub 120 is attached to the spokes 206 extending from the rim 205 of a wheel, the wheel is now complete and ready to be mounted in a bicycle.

A method of using the adjustable axle assembly 10 according to the present invention will now be discussed in reference to FIGS. 1, 2, 7A and 7B. Once the front and rear wheels 202 and 204 are installed in the body 210 of the bicycle 200, the bicycle is now read for use. By pushing down on the lever 102, which in effect pushes the lock 172, the lock 172 disengages one of the indents 124 of the second hub 120. Since there is no longer a locking mechanism to hinder the movement of the first hub 110, the first hub 110 can now be rotated with respect to the second hub 120 to set a desired angle of eccentric rotation. When the first hub 110 is rotated to be in the indent designated as "0," the axle 112 is right at the geometric center of the wheel and therefore a level ride occurs. The adjustable axle assembly of both the front and rear wheels 202 and 204 can be adjusted to maintain a level ride.

When a rider desires a more bumpy or undulating ride, the position of the first hub 110 is adjusted with respect to the second hub 120 by controlling the lever 102. When there are four axle positions for each wheel, there are a total of sixteen different riding positions. The eccentric rotation of the wheel can be adjusted while the bicycle is stopped and the rider is seating on a bicycle seated by simple sliding the lever 102 to control the position of the lock 172.

The same use is applied when the wheel, using the adjustable axle assembly 10 of the present invention, is used in an exercise bicycle shown in FIG. 2. The adjustment of the location of the axle provides the rider with a more enjoyable and undulating ride which is not available in a regular bicycle.

When the adjustable axle assembly 10 according to the present invention is used in a wheel that has no spokes, the second hub 120 can be configured to serve as a rim for receiving a tire thereon. For example, when the adjustable axle assembly 10 is configured to be used in a toy pull cart or go cart, the second hub 120 becomes the rim of the wheel for receiving the tire.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An adjustable axle assembly for use with a wheel, the axle assembly comprising:

a first hub defining a first aperture in an off-centered position so geometric centers of the first aperture and the first hub are eccentrically located, the first aperture adapted to receive an axle;

a second hub defining a second aperture in an off-centered position so the geometric centers of the second aperture and the second hub are eccentrically located, the second aperture adapted to rotationally receive the first hub;

a locking assembly coupling and controlling the rotational movement of the first hub and the second hub; and a roller bearing disposed in the second aperture of the second hub between the first hub and the second hub to assist rotation of the first hub.

2. The adjustable axle assembly of claim 1, wherein the locking assembly is disposed in the first hub and includes a lock protruding from the first hub to releasably engage the second hub.

3. The adjustable axle assembly of claim 2, wherein the locking assembly includes:

a platform secured to an inner surface of the first hub;

at least one alignment rod extending from the platform to guide the movement of the lock; and a spring disposed in surrounding relation to the alignment rod, wherein the spring biases the lock to a locking position to prevent the first hub from rotating with respect to the second hub.

4. The adjustable axle assembly of claim 2, wherein the first hub includes a slit, wherein a wing of the lock protrudes therethrough and is coupled to a lever to releasably control the rotation of the first hub with respect to the second hub.

5. The adjustable axle assembly of claim 1, wherein the first hub includes right and left plates, each plate defining an aperture adapted to receive the axle, the right and left plates being fastened together from opposite sides of the second aperture of the second hub.

6. The adjustable axle assembly of claim 1, wherein the second aperture of the second hub, includes a plurality of indents formed on the inner surface of the second hub separated by a predetermined angle for releasably engaging the locking assembly, wherein the plurality of indents represents an angle of eccentric rotation of the wheel.

7. The adjustable axle assembly of claim 2, further including a roller bearing disposed in the second aperture of the second hub between the first hub and the second hub to assist rotation of the first hub.

8. The adjustable axle assembly of claim 2, wherein the first hub includes right and left plates, each plate defining an aperture adapted to receive the axle, the right and left plates being fastened together from opposite sides of the second aperture of the second hub.

9. The adjustable axle assembly of claim 2, wherein the second aperture of the second hub includes a plurality of indents formed on the inner surface of the second hub separated by a predetermined angle for releasably engaging the locking assembly, wherein the plurality of indents represents an angle of eccentric rotation of the wheel.

10. The adjustable axle assembly of claim 6, wherein at least one of the plurality of indents positions the first hub with respect to the second hub to place the axle in a geometric center of the second hub to provide a concentric rotation of the wheel.

11. The adjustable axle assembly of claim 9, wherein at least one of the plurality of indents positions the first hub with respect to the second hub to place the axle in a geometric center of the second hub to provide a concentric rotation of the wheel.

12. A mobile apparatus comprising:
   at least one wheel having a rim with a geometric center;
   a first hub defining a first aperture in an off-centered position so geometric centers of the first aperture and the first hub are eccentrically located, the first aperture adapted to receive an axle;
   a second hub defining a second aperture in an off-centered position so the geometric centers of the second aperture and the second hub are eccentrically located, the second aperture adapted to rotationally receive the first hub, wherein the second hub has the same geometric center as the rim;
   a locking assembly coupling and controlling the rotational movement of the first hub and the second hub; and
   a roller bearing disposed in the second aperture of the second hub between the first hub and the second hub to assist rotation of the first hub.

13. The mobile apparatus of claim 12, wherein the locking assembly is disposed in the first hub and includes a lock protruding from the first hub to releasably engage the second hub.

14. The mobile apparatus of claim 12, wherein the first hub includes right and left plates, each plate defining an aperture adapted to receive the axle, the right and left plates being fastened together from opposite sides of the second aperture of the second hub.

15. The mobile apparatus of claim 12, wherein the second aperture of the second hub includes a plurality of indents formed on the inner surface of the second hub separated by a predetermined angle for releasably engaging the locking assembly, wherein the plurality of indents represents an angle of eccentric rotation of the wheel.

16. The mobile apparatus of claim 12, wherein the second hub is connected to the rim through a plurality of spokes.

17. The mobile apparatus of claim 13, wherein the locking assembly includes:
   a platform secured to an inner surface of the first hub;
   at least one alignment rod extending from the platform to align the movement of the lock; and
   a spring disposed in surrounding relation to the alignment rod, wherein the spring biases the lock to a locking position to prevent the first hub from rotating with respect to the second hub.

18. The mobile apparatus of claim 13, wherein the first hub includes a slit, wherein a wing of the lock protrudes therethrough and is coupled to a lever to releasably control the rotation of the first hub with respect to the second hub.

19. The mobile apparatus of claim 13, wherein the rim of the wheel is an outer circumferential surface of the second hub.

20. The mobile apparatus of claim 15, wherein at least one of the plurality of indents positions the first hub with respect to the second hub to place the axle in a geometric center of the second hub to provide a concentric rotation of the wheel.

21. A method of manufacturing an adjustable axle assembly for use with a wheel, the method comprising the steps of:
   providing a first hub defining a first aperture in an off-centered position so geometric centers of the first aperture and the first hub are eccentrically located, the first aperture adapted to receive an axle;
   providing a second hub defining a second aperture in an off-centered position so the geometric centers of the second aperture and the second hub are eccentrically located, the second aperture adapted to rotationally receive the first hub;
   providing a locking assembly in the first hub for releasably coupling and controlling the rotational movement of the first hub and the second hub; and
   placing a roller bearing in the second aperture of the second hub between the first hub and the second hub to assist rotation of the first hub.

22. The method of claim 21, wherein the locking assembly is disposed in the first hub and includes a lock protruding from the first hub to releasably engage the second hub.

23. The method of claim 22, wherein the first hub includes a slit, wherein a wing of the lock protrudes therethrough and is coupled to a lever to releasably control the rotation of the first hub with respect to the second hub.

24. The method of claim 21, wherein the second aperture of the second hub includes a plurality of indents formed on the inner surface of the second hub separated by a predetermined angle for releasably engaging the locking assembly, wherein the plurality of indents represents an angle of eccentric rotation of the wheel.

25. The method of claim 24, wherein at least one of the plurality of indents positions the first hub with respect to the second hub to place the axle in a geometric center of the second hub to provide a concentric rotation of the wheel.

* * * * *